March 10, 1925.
A. G. SEBRING
FISHING TOOL
Filed March 1, 1924
1,529,553
2 Sheets-Sheet 1
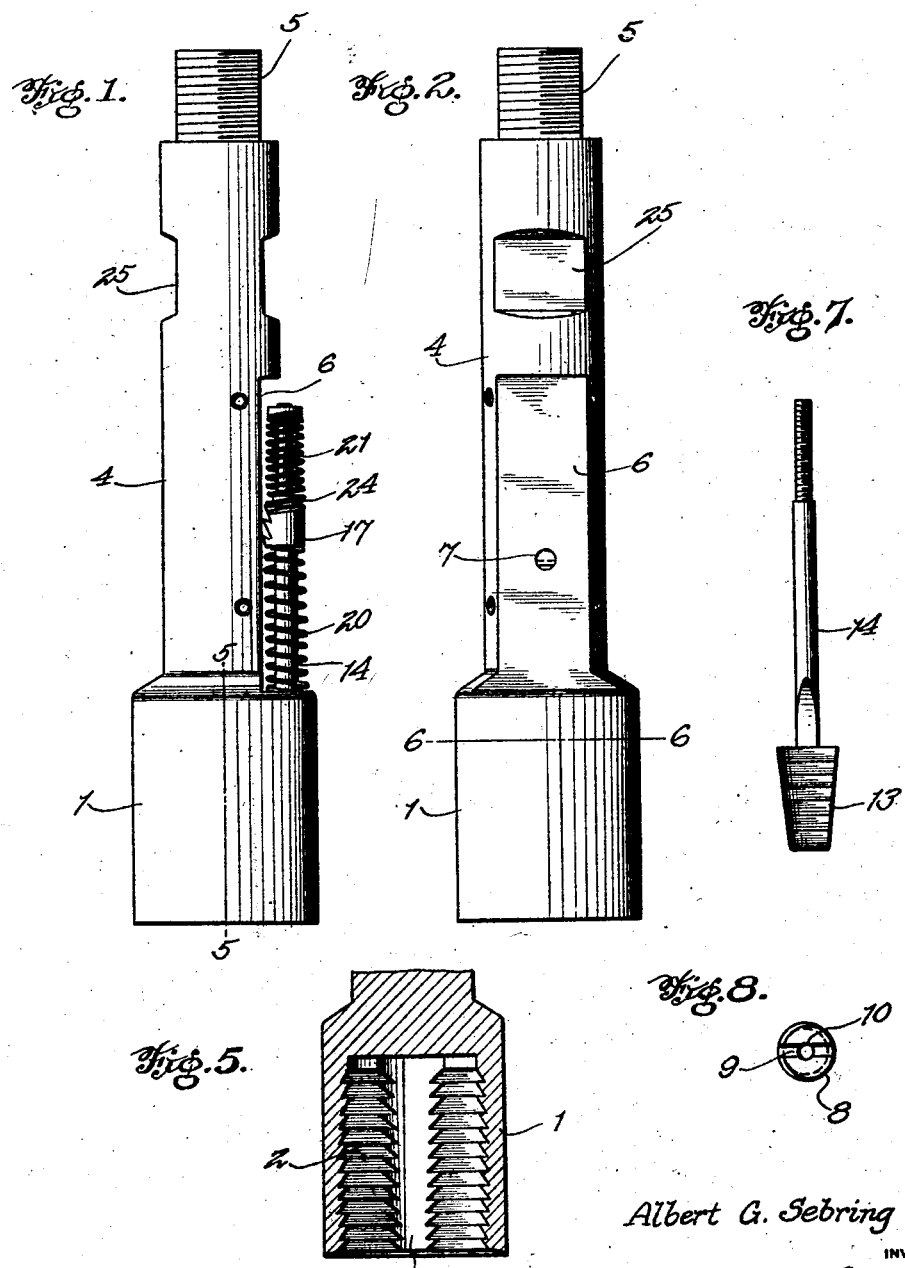

March 10, 1925.

A. G. SEBRING

FISHING TOOL

Filed March 1, 1924

Albert G. Sebring
INVENTOR

BY Victor J. Evans
ATTORNEY

WITNESS: R. E. Wise.
L. B. Middleton.

Patented Mar. 10, 1925.

1,529,553

UNITED STATES PATENT OFFICE.

ALBERT G. SEBRING, OF PARKERTON, WYOMING.

FISHING TOOL.

Application filed March 1, 1924. Serial No. 696,355.

*To all whom it may concern:*

Be it known that I, ALBERT G. SEBRING, a citizen of the United States, residing at Parkerton, in the county of Converse and State of Wyoming, have invented new and useful Improvements in Fishing Tools, of which the following is a specification.

This invention relates to improvements in fishing tools for well drilling apparatus, and relates particularly to that class of tools designed for recovering lost or separated portions of drilling tools.

An object of the present invention is the provision of a tool wherein the gripping surface is substantial and stationary to the bowl of the socket, wherein the stress is greatly reduced and is only equal to the amount of end pull on the socket.

Another object of the invention is the provision of trip means so as to enable said socket to be released at any time desirable, either in the well or on the surface.

Another object of the invention is the provision of wedge means that takes only sufficient wedge strain to prevent the gripping surface from slipping, enabling the tool to be used when the area between the inner wall of well and circumference of drilling tool is limited.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the device, with parts broken away.

Figure 2 is a longitudinal sectional view of the socket and stem with parts broken away.

Figure 5 is a similar view showing the parts in another position.

Figure 7 is a section on line 7—7 of Figure 1.

Figure 8 is a detail view.

Figure 3:
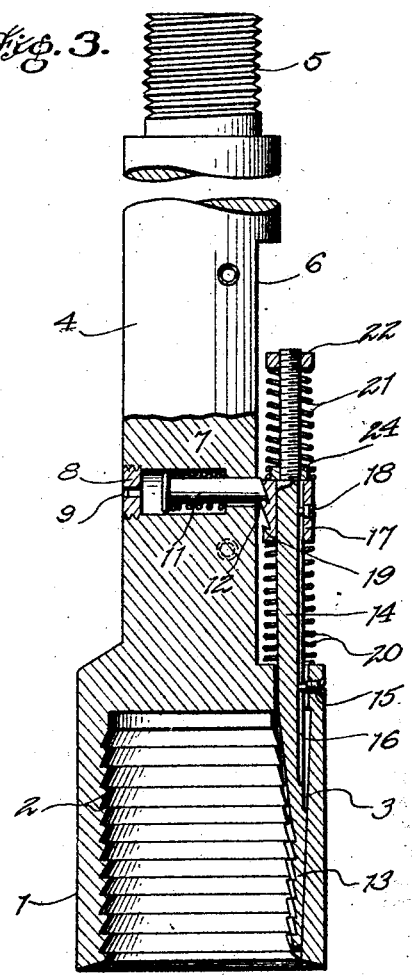
Figure 3 is a similar view to Figure 2 but taken at right angles thereto.
Figure 4:
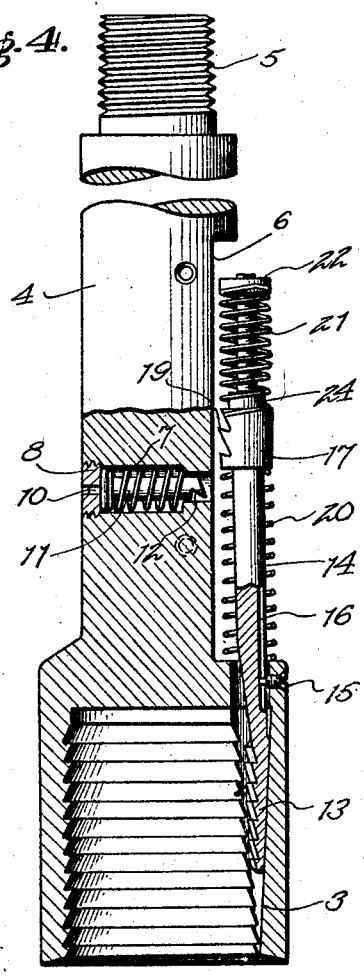
Figure 4 is an enlarged detail sectional view showing the parts in one position.
Figure 6:
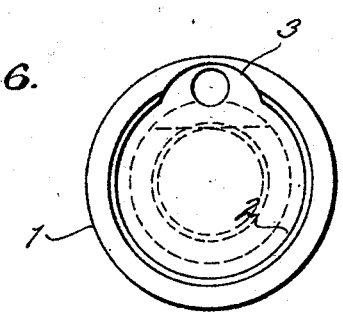
Figure 6 is a section on line 6—6 of Figure 1.

In these views, 1 indicates the bowl or socket part which has its interior formed with the gripping teeth 2 and which is formed with a wedge seat 3 by removing portions of the toothed surface to provide a tapered arc-shaped portion which forms the seat. The shank is shown at 4 and has a reduced threaded end 5 and a flattened part 6. A transversely extending hole 7 is formed in the shank and has one end reduced, this reduced end opening out on the flat surface 6. The other end of the hole is threaded to receive a threaded plug 8 which is formed with a tool receiving slot 9 and a hole 10. A spring pressed plunger 11 is placed in the hole 7 and is normally held in retracted position by the spring. It is provided with an undercut notch 12 which forms a latch as hereinafter described. A toothed wedge 13 engages the seat 3 and has its stem 14 passing through a hole in the socket. The stem is held against rotary movement by means of a pin 15 in the socket engaging the longitudinally extending groove 16 formed in the stem. A sleeve 17 is slidably mounted on the stem and is held against rotary movement thereon by a pin 18 therein engaging the groove 16. This sleeve is provided with the teeth 19 which are adapted to be engaged by the latch part of the pin 11 when the pin is pressed inwardly by a suitable implement being passed through the hole 10, in the plug 8. A compression spring 20 is placed on the stem between the socket and the sleeve and a tension spring 21 is laced on the stem and has its ends connected with the sleeve and with a nut 22 on the end of the stem. A trip nut 24 is placed on the stem and limits the movement of the sleeve. The parts are enclosed by a casing 23 placed on the stem and the shank may be provided with a wrench engaging part 25.

The device is set by pushing downwardly the sleeve until it is opposite the plunger and then pushing out the plunger so that its latch part will engage a tooth on the sleeve. This will hold the parts in this position through the undercut walls of the notch and teeth. The device is then lowered in the well and when it is forced down over the drilling tool or other object to be recovered from the well, the wedge and its stem will be forced upwardly and thus stretch the tension spring as the stem moves through the sleeve and the nut 22 is moved away from said sleeve. When the end pull begins the tension spring will act to move the wedge stem downwardly and thus wedge the drilling tool within the socket. As the pull increases, the wedge stem moves downwardly until the trip nut comes in contact with the sliding sleeve and releases the same from the spring plunger, thus permitting the compression spring 20 to act to lift the wedge and its stem up.

It will thus be seen that I have provided a very efficient tool for recovering objects from wells and wherein the stress is greatly reduced and the device can be easily and quickly released from the object either in the well or on the surface.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A fishing tool comprising a socket member having teeth upon its interior walls, a toothed wedge member slidably mounted in the socket member, a stem on the wedge member, a shank on the socket member having a flattened part for receiving the stem, tension and compression means associated with the stem, locking mechanism for the stem and wedge and trip mechanism for the locking mechanism.

2. A fishing tool comprising a socket member and a shank, the socket member having teeth upon its interior walls, a toothed wedge slidably mounted in the socket member and having its stem projecting through the same parallel to the shank, said shank having a flattened surface to provide a space for the stem, a spring pressed plunger carried by the shank, a toothed sleeve slidably mounted on the stem and adapted to be engaged by the plunger, a tension spring connecting the sleeve with a part on the stem, a compression stem engaging the sleeve and a trip nut on the sleeve for releasing the same from the plunger.

3. A fishing tool comprising a socket and a shank, the socket having teeth upon its interior walls and the shank having a flat surface, a wedge in the socket having its stem passing through the same and engaging the space formed by the flat surface of the shank, a toothed sleeve slidably mounted on the stem, a tension spring on the stem connecting the sleeve with a part of the stem, a compression spring on the stem engaging the sleeve, a spring pressed plunger having a latch part for engaging the teeth on the sleeve and a casing enclosing the shank and the parts carried thereby.

In testimony whereof I affix my signature.

ALBERT G. SEBRING.